US010346000B2

(12) United States Patent
Ichikawa et al.

(10) Patent No.: US 10,346,000 B2
(45) Date of Patent: Jul. 9, 2019

(54) INFORMATION PROCESSING APPARATUS AND METHOD, INFORMATION PROCESSING SYSTEM FOR IMPROVED SECURITY LEVEL IN BROWSING OF CONTENT

(71) Applicant: SONY CORPORATION, Tokyo (JP)

(72) Inventors: Hirotake Ichikawa, Tokyo (JP); Tsuyoshi Ishikawa, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 281 days.

(21) Appl. No.: 14/615,813

(22) Filed: Feb. 6, 2015

(65) Prior Publication Data
US 2015/0234559 A1    Aug. 20, 2015

(30) Foreign Application Priority Data
Feb. 18, 2014    (JP) .................................. 2014-028066

(51) Int. Cl.
| G06F 3/0481 | (2013.01) |
| G06F 3/0484 | (2013.01) |
| G06F 3/0488 | (2013.01) |
| G06F 3/14 | (2006.01) |
| G09G 5/14 | (2006.01) |
| G09G 3/00 | (2006.01) |

(52) U.S. Cl.
CPC .......... *G06F 3/0484* (2013.01); *G06F 3/0481* (2013.01); *G06F 3/0488* (2013.01); *G06F 3/1454* (2013.01); *G09G 5/14* (2013.01); *G09G 3/001* (2013.01); *G09G 2354/00* (2013.01); *G09G 2358/00* (2013.01)

(58) Field of Classification Search
CPC ...................................................... G06F 3/0481
USPC ........................................................... 715/788
See application file for complete search history.

(56) References Cited

U.S. PATENT DOCUMENTS

| 6,507,802 | B1 * | 1/2003 | Payton ................... G06Q 99/00 |
| | | | 702/150 |
| 7,272,610 | B2 * | 9/2007 | Torres ............... G06F 17/30011 |
| 8,922,480 | B1 * | 12/2014 | Freed ....................... G09G 5/00 |
| | | | 345/156 |
| 8,925,106 | B1 * | 12/2014 | Steiner .................... G06F 21/31 |
| | | | 726/28 |
| 9,317,713 | B2 * | 4/2016 | Wong .................. G06F 21/6245 |
| 9,443,070 | B2 * | 9/2016 | Torgersrud ............ G06Q 10/10 |
| 2006/0095397 | A1 * | 5/2006 | Torres ................. G06F 17/3089 |
| 2006/0095976 | A1 * | 5/2006 | Torres ................. G06F 17/3089 |
| | | | 726/28 |

(Continued)

FOREIGN PATENT DOCUMENTS

| JP | 2009-087026 A | 4/2009 |
| JP | 2013-143150 A | 7/2013 |

*Primary Examiner* — Daniel Rodriguez
(74) *Attorney, Agent, or Firm* — Chip Law Group

(57) ABSTRACT

There is provided an information processing apparatus including a display section which displays a window for each content including an application program used for each user, and a window management section which manages a display of the window displayed on the display section, at the time when the window is displayed on the display section in a state capable of being browsed by a user not registered in a permitter list to which a user permitted to browse the window is registered, in a state not able to be browsed or difficult to be browsed for a user not registered in the permitter list.

9 Claims, 13 Drawing Sheets

(56) References Cited

U.S. PATENT DOCUMENTS

| | | | | |
|---|---|---|---|---|
| 2006/0109238 A1* | 5/2006 | Lau | G06F 3/013 | 345/156 |
| 2008/0092064 A1* | 4/2008 | Zilca | G06F 3/011 | 715/757 |
| 2009/0141895 A1* | 6/2009 | Anderson | G06F 21/84 | 380/252 |
| 2009/0234902 A1* | 9/2009 | Pilosof | G06Q 10/06 | 709/201 |
| 2010/0195064 A1* | 8/2010 | Kim | G03B 21/14 | 353/121 |
| 2010/0313239 A1* | 12/2010 | Chakra | G06F 21/6218 | 726/2 |
| 2011/0063191 A1* | 3/2011 | Leung | G06F 3/0481 | 345/1.1 |
| 2011/0296490 A1* | 12/2011 | Faitelson | G06F 21/6218 | 726/1 |
| 2011/0296507 A1* | 12/2011 | Khosrowshahi | G06F 17/24 | 726/7 |
| 2013/0198809 A1* | 8/2013 | Lunt | H04L 51/12 | 726/4 |
| 2013/0307870 A1* | 11/2013 | Ashbrook | G06F 21/84 | 345/629 |
| 2014/0041042 A1* | 2/2014 | Wong | G06F 21/60 | 726/26 |
| 2014/0055400 A1* | 2/2014 | Reuschel | G06F 9/452 | 345/173 |
| 2014/0198958 A1* | 7/2014 | Nathan | G06F 21/32 | 382/116 |
| 2014/0223335 A1* | 8/2014 | Pearson | H04L 65/403 | 715/753 |
| 2015/0047050 A1* | 2/2015 | Das | G06F 21/10 | 726/26 |
| 2015/0149929 A1* | 5/2015 | Shepherd | H04L 65/403 | 715/753 |
| 2015/0234559 A1* | 8/2015 | Ichikawa | G06F 3/0484 | 715/788 |
| 2015/0287432 A1* | 10/2015 | Nakano | G06F 21/10 | 386/259 |

* cited by examiner

FIG. 4
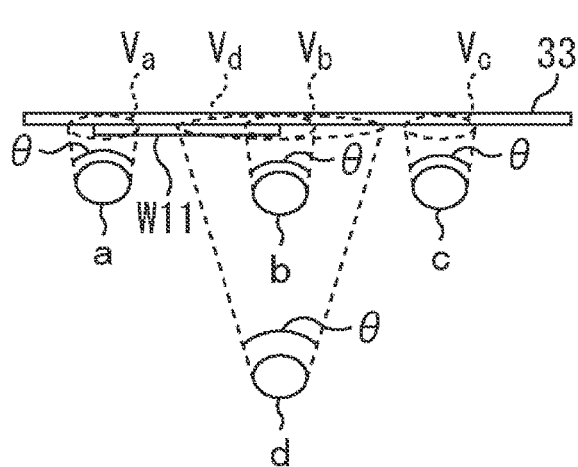
| USER ID | BROWSABILITY |
|---|---|
| a | POSSIBLE |
| b | POSSIBLE |
| c | NOT POSSIBLE |
| d | NOT POSSIBLE |
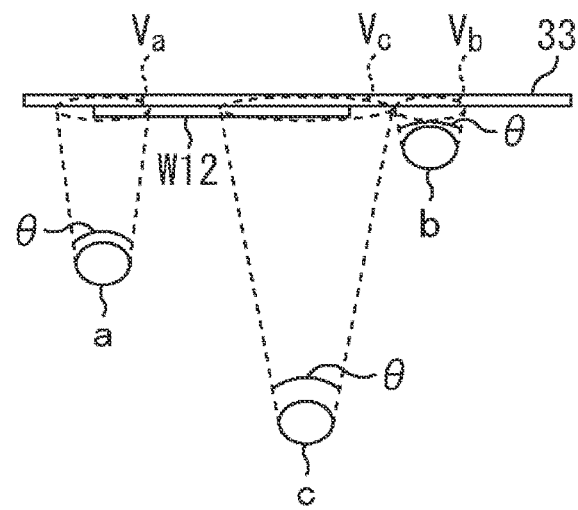
| USER ID | BROWSABILITY |
|---|---|
| a | POSSIBLE |
| b | NOT POSSIBLE |
| c | POSSIBLE |

FIG. 5

| WINDOW W1 | | | | |
|---|---|---|---|---|
| DISPLAY START TIME | 2013/11/11 10:10 | 2013/11/11 10:15 | 2013/11/22 9:00 | 2013/11/22 11:00 |
| DISPLAY END (CHANGE) TIME | 2013/11/11 10:15 | 2013/11/11 12:00 | 2013/11/22 11:00 | 2013/11/22 11:05 |
| BROWSABILITY USERS | b, c | b, c, d | b | b, e |

| WINDOW W2 | | | | |
|---|---|---|---|---|
| DISPLAY START TIME | 2013/11/11 10:13 | 2013/11/11 10:18 | 2013/11/22 9:00 | 2013/11/22 11:00 |
| DISPLAY END (CHANGE) TIME | 2013/11/11 10:18 | 2013/11/22 9:00 | 2013/11/22 11:00 | 2013/11/22 11:05 |
| BROWSABILITY USERS | c | b | b | b, e |

WINDOW W3
. . .

FIG. 6

| WINDOW W1 | b, c, d, e |
| WINDOW W2 | c, b, e |
| WINDOW W3 | b, c |
| ⋮ | ⋮ |

INFORMATION PROCESSING APPARATUS AND METHOD, INFORMATION PROCESSING SYSTEM FOR IMPROVED SECURITY LEVEL IN BROWSING OF CONTENT

CROSS REFERENCE TO RELATED APPLICATIONS

This application claims the benefit of Japanese Priority Patent Application JP 2014-028066 filed Feb. 18, 2014, the entire contents of which are incorporated herein by reference.

BACKGROUND

The present disclosure relates to an information processing apparatus and method, an information processing system and a program, and specifically relates to an information processing apparatus and method, an information processing system and a program which can be implemented without specially setting an acceptability of browsing of content for a plurality of users.

In recent years, the spread of display apparatuses, which a plurality of users can simultaneously operate by using a large-sized touch panel, has been progressing. In the case where a display apparatus including a large-sized display panel is used, it is possible for one content to be simultaneously browsed by a plurality of users, while on the other hand, protection of privacy and security for the displayed content will become an important point.

Accordingly, technology has been proposed which uses human relationship information between a plurality of users for a determination of an acceptability of a display, in a terminal which is assumed to be simultaneously used by a plurality of similar people (refer to JP 2009-087026A), and technology has been proposed which sets a security level for each content in advance, such as setting the three levels of editing, only browsing and nothing possible or the like as an example, and determines an acceptability of a display, by using a polarizing panel in accordance with this (refer to JP 2013-143150A).

SUMMARY

However, JP 2009-087026A and JP 2013-143150A do not mention a method for setting a security level.

Further, at the present time where application programs individually used by users and publication levels of these are diverse and detailed for each content, setting individual security levels for a user group in which users may use a screen of each content will be very costly, and is not realistic.

The present disclosure is performed by considering such a situation, and specifically can be implemented, when displaying content by a large-sized display panel, without specially setting an acceptability of browsing of the content for a plurality of users.

According to an embodiment of the present disclosure, there is provided an information processing apparatus including a display section which displays a window for each content including an application program used for each user, and a window management section which manages a display of the window displayed on the display section, at the time when the window is displayed on the display section in a state capable of being browsed by a user not registered in a permitter list to which a user permitted to browse the window is registered, in a state not able to be browsed or difficult to be browsed for a user not registered in the permitter list.

The information processing apparatus may further include an imaging section which captures an image of a range in which users browsing the display section are present, a browsability list generation section which specifies a visual field range for each of the users based on a browsing position with respect to the display section of each user within the image and a display position of each window displayed on the display section, determines an acceptability of browsing each window for each of the users based on whether or not each window is within a visual field range and within a browsable distance, and registers the determined acceptability of browsing each window for each of the users in a browsability list, a browsability history generation section which generates a history of the browsability list, and a list registration section which registers a user registered in a browsability history as being capable of browsing to the permitter list for each of the windows.

The window management section may manage a display of the window displayed on the display section, at the time when the window is displayed on the display section in a state capable of being browsed by a user not registered in the permitter list, in a state not able to be browsed or difficult to be browsed for a user not registered in the permitter list by switching to a display of any one, or combination, of a non-display, a semi-transparent display, a compressed display, and a position change display from a browsing position of a user not registered in the permitter list to a position not able to be browsed or difficult to be browsed.

The information processing apparatus may further include a communication section which exchanges data with a portable terminal. In the case where a display of the window displayed on the display section is managed in a state not able to be browsed or difficult to be browsed for a user not registered in the permitter list, the window management section may transmit, to the portable terminal, a non-browsable window list including a list of windows managed in a state not able to be browsed or difficult to be browsed for a user not registered in the permitter list, by controlling the communication section.

In the case where an instruction is received, from the portable terminal, for switching any of the windows registered in the non-browsable window list to a browsable state, the window management section may manage the window managed in a state not able to be browsed or difficult to be browsed for a user not registered in the permitter list so as to be switched to a browsable state and displayed, by controlling the communication section.

The information processing apparatus may further include a registration section, in the case where the window is displayed on the display section, which registers a user browsing the window in the permitter list.

According to another embodiment of the present disclosure, there is provided an information processing method including displaying, by a display section, a window for each content including an application program used for each user, and managing a display of the window displayed on the display section, at the time when the window is displayed on the display section in a state capable of being browsed by a user not registered in a permitter list to which a user permitted to browse the window is registered, in a state not able to be browsed or difficult to be browsed for a user not registered in the permitter list.

According to still another embodiment of the present disclosure, there is provided a program for causing a computer, which controls an information processing apparatus including a display section which displays a window for each content including an application program used for each user, to execute a process of managing a display of the window displayed on the display section, at the time when the window is displayed on the display section in a state capable of being browsed by a user not registered in a permitter list, in a state not able to be browsed or difficult to be browsed for a user not registered in the permitter list.

According to yet another embodiment of the present disclosure, there is provided an information processing system including an information processing apparatus, and a portable terminal. The information processing apparatus includes a display section which displays a window for each content including an application program used for each user, a window management section which manages a display of the window displayed on the display section, at the time when the window is displayed on the display section in a state capable of being browsed by a user not registered in a permitter list to which a user permitted to browse the window is registered, in a state not able to be browsed or difficult to be browsed for a user not registered in the permitter list, and a first communication section which exchanges data with the portable terminal. In the case where a display of the window displayed on the display section is managed in a state not able to be browsed or difficult to be browsed for a user not registered in the permitter list, the window management section transmits, to the portable terminal, a non-browsable window list including a list of windows managed in a state not able to be browsed or difficult to be browsed for a user not registered in the permitter list, by controlling the first communication section, and, in the case where an instruction is received, from the portable terminal, for switching any of the windows registered in the non-browsable window list to a browsable state, the window management section manages the window managed in a state not able to be browsed or difficult to be browsed for a user not registered in the permitter list so as to be switched to a browsable state and displayed, by controlling the first communication section.

The portable terminal includes a communication section which receives the non-browsable window list, and transmits an instruction for switching any of the windows registered in the non-browsable window list to a browsable state, a display section which displays the non-browsable window list, and an operation section which inputs an instruction for switching any of the windows registered in the non-browsable window list to a browsable state.

According to an embodiment of the present disclosure, by a display section, a window for each content including an application program used for each user may be displayed. A display of the window displayed on the display section may be managed, at the time when the window is displayed on the display section in a state capable of being browsed by a user not registered in a permitter list to which a user permitted to browse the window is registered, in a state not able to be browsed or difficult to be browsed for a user not registered in the permitter list.

According to an embodiment of the present disclosure, it becomes possible to be implemented, when displaying content by a large-sized display panel, without specially setting an acceptability of browsing of the content for a plurality of users.

BRIEF DESCRIPTION OF THE DRAWINGS

FIG. 4 is a figure which describes a browsability list;

FIG. 5 is a figure which describes a browsability history;

FIG. 6 is a figure which describes a white list;

DETAILED DESCRIPTION OF THE EMBODIMENT(S)

Figure 1:
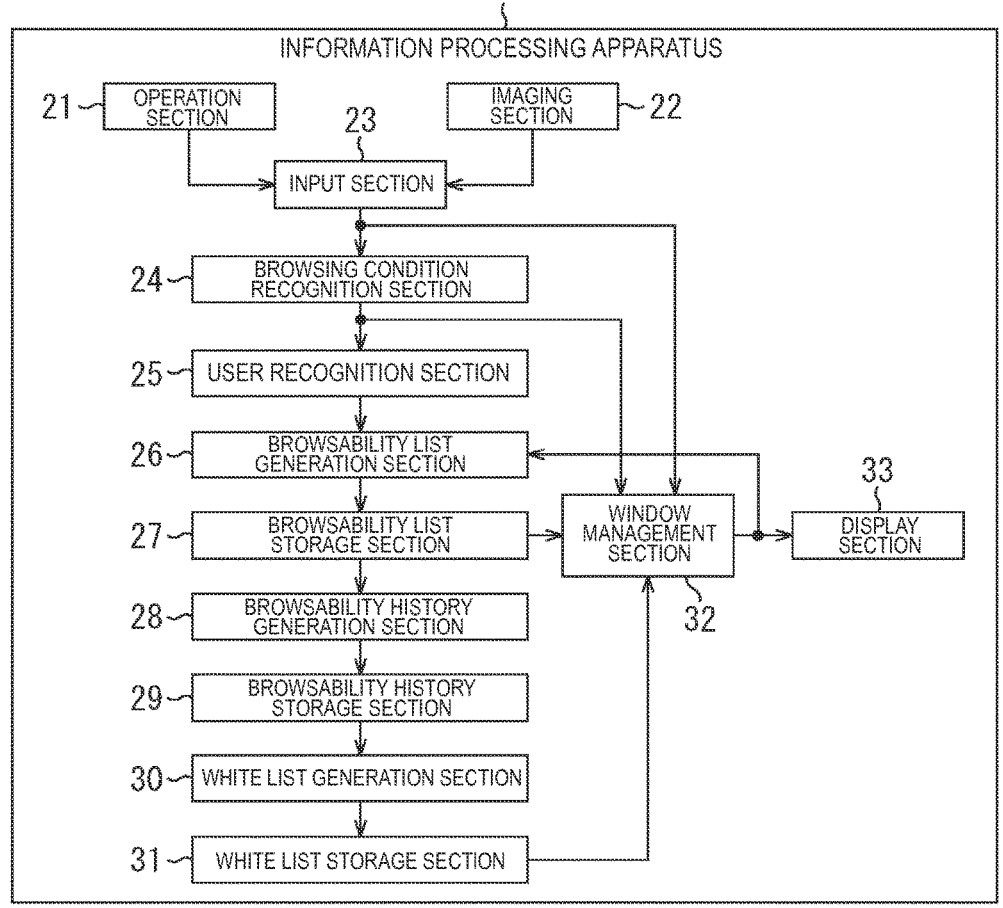
FIG. 1 is a block diagram which describes a configuration of an embodiment of an information processing apparatus applicable to the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Hereinafter, the modes (hereinafter, called embodiments) for implementing the present disclosure will be described. A description will be made in the following order.

1. First embodiment (case of a configuration of only an information processing apparatus)

2. Second embodiment (case of an information processing system including an information processing apparatus and a portable terminal)

1. First Embodiment

Configuration Example of an Information Processing Apparatus

FIG. 1 is a block diagram which shows a configuration example of an embodiment of an information processing apparatus applicable to the present disclosure.

The information processing apparatus 11 of FIG. 1 includes an operation section 21 and a display section 33 constituted from a large-sized touch panel, and a plurality of users can individually execute and display content constituting an application program. Further, the information processing apparatus 11 displays an execution result of respective content by respective window units. In addition, the information processing apparatus 11 can be executed without setting in advance a browsing limitation of the content of windows displayed by being executed by a prescribed user. That is, the information processing apparatus 11 includes an imaging section 22, captures a range in which people who are browsing the display section 33 are present, displays windows at the time when the users within the captured image are only users who are permitted to browse, and in the case where a user is present who is not permitted to browse by himself or herself, displays the windows in a state not able to be browsed or difficult to be browsed for the user who is not permitted to browse.

More specifically, the information processing apparatus 11 includes an imaging section 22, an operation section 21, an input section 23, a browsing condition recognition section 24, a user recognition section 25, a browsability list generation section 26, a browsability list storage section 27, a browsability history generation section 28, a browsability history storage section 29, a white list generation section 30, a white list storage section 31, a window management section 32, and a display section 33.

The imaging section 22 is constituted from a Charge Coupled Device (CCD), a Complementary Metal Oxide Semiconductor (CMOS) or the like. The imaging section 22 captures an image of a range in which users are present, who are browsing the windows of each content displayed on the display section 33 which is constituted from a Liquid Crystal Display (LCD), an organic Electro Luminescence (EL) or the like of the information processing apparatus 11, or who are inputting operations of these windows, and supplies the captured image to the input section 23. Note that, the imaging section 22 may output a plurality of images not just by one unit, but by a plurality of units, and in the configuration example which will be described later with reference to FIG. 3, the imaging section 22 will be constituted of the two units of imaging sections 22-1 and 22-2.

The operation section 21 is constituted from a touch panel or the like included on the display section 33, receives an operation input of a user, generates operation signals corresponding to the operation content, and outputs the generated operation signals to the input section 23 together with information of an operation position on the display section 33. Further, in the case where operation buttons, a keyboard or the like are additionally included, and operations are performed by these, the operation section 21 outputs operation signals corresponding to the operation content to the input section 23 together with information of the positions at which the operation buttons and keyboard are arranged.

The input section 23 receives the images supplied by the imaging section 22 and an input of information of the operation signals and operation position supplied by the operation section 21, outputs information of the images to the browsing condition recognition section 24, and supplies the information of the operation signals and operation position to the window management section 32.

The browsing condition recognition section 24 recognizes distances and positions from the display section 33, based on the images captured by the imaging section 22 and based on the browsing positions of users who become a browsers present within the images, and supplies the recognized distances and positions to the user recognition section 25 and the window management section 32 together with the images as a browsing condition.

The user recognition section 25 extracts facial images of the users captured within the images supplied by the input section 23, extracts information, such as the space between the left and right eyes, a distance from the tip of the nose up to the jaw or the like, as information of a characteristic amount for identifying a facial image, for example, from the extracted facial images, performs recognition based on a combination of these, attaches user IDs (Identifier) which become recognition results, and supplies the attached user IDs to the browsability list generation section 26 together with information of the browsing positions.

The browsability list generation section 26 determines an acceptability of the possibility of browsing each window displayed on the display section 33 for each user, based on information of the browsing conditions and user IDs and information of the position of each window (content) displayed on the display section 33 by the window management section 32, generates a browsing list based on a determination result, and causes the generated browsing list to be stored in the browsability list storage section 27.

The browsability history generation section 28 generates a browsability history for each window, based on the browsability list stored in the browsability list storage section 27, and causes the generated browsability history to be stored in the browsability history storage section 29.

The white list generation section 30 generates a white list which is a list of user IDs permitted to browse for each window, based on the browsability history stored in the browsability history storage section 29, and causes the generated white list to be stored in the white list storage section 31.

The window management section 32 causes application programs executing each of the content to be executed, based on operation signals corresponding to the operation content from the operation section 21 via the input section 23, and displays an execution result by window units. Further, the window management section 32 collates the browsability list and the white list for each window stored in the browsability list storage section 27, and for the users who are capable of browsing in the browsability list, sets the windows where users are present who are not registered in the white list to a non-display, and in cases other than this, displays the windows.

<White List Generation Process>

Figure 2:
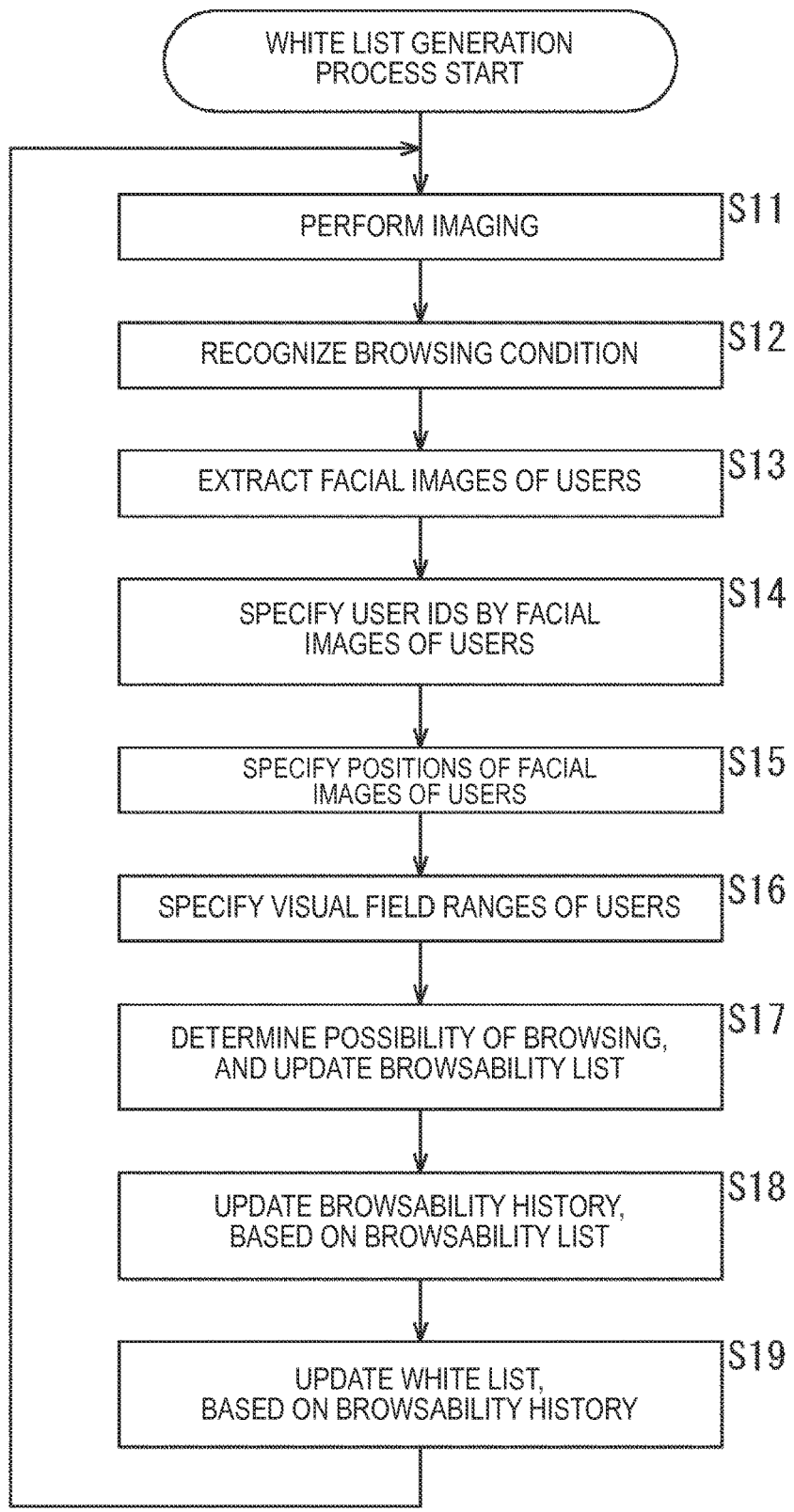
FIG. 2 is a flow chart which describes a white list generation process by the information processing apparatus of FIG. 1.

Next, a white list generation process will be described with reference to the flow chart of FIG. 2.

Figure 3:
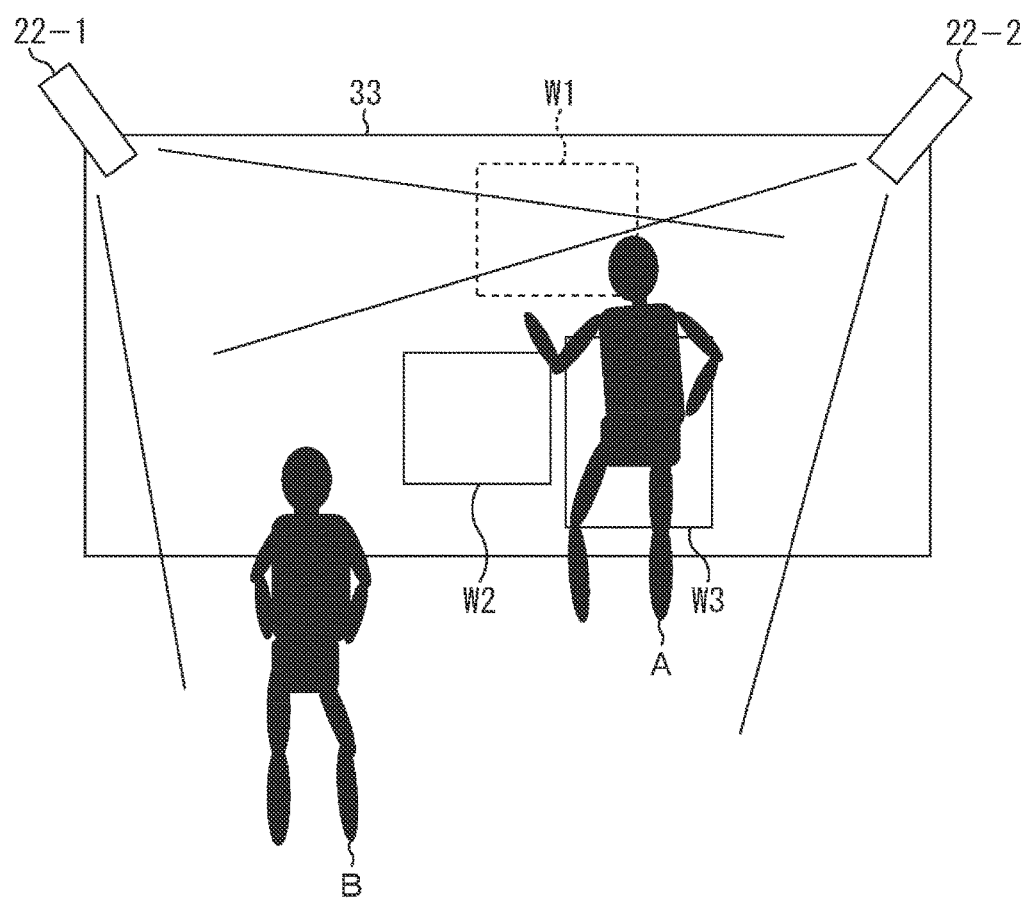
FIG. 3 is a figure which describes the case in which windows are displayed on a display section, and users are browsing.

In step S11, the imaging section 22 captures a range in which users are capable of browsing the display section 33, and supplies the captured images to the browsing condition recognition section 24. For example, as shown in FIG. 3, in the case where the imaging sections 22-1 and 22-2 are included in the upper left and upper right parts of the display section 33, the imaging sections 22-1 and 22-2 capture users A and B who are respectively browsing the display section 33. Note that, windows W1 through to W3 are displayed on the display section 33 in FIG. 3, the user A is present in front of the display section 33, and the user B is present at a position separated from the display section 33 more than that of the user A.

In step S12, the browsing condition recognition section 24 recognizes a browsing condition of each window in the present display section 33, based on the supplied images, and supplies information of the browsing condition and the images to the user recognition section 25.

Here, the browsing condition is information which shows the positions at which the windows are displayed on the display section 33, and the present arrangement of users who are browsers with respect to the display section 33 and is information such as that shown on the upper left part of FIG. 4, for example. The browsing condition of the upper left part of FIG. 4 shows that users a through to d are present in front of the display section 33, users a through to c are present in order from the left at a position in front of the display section 33, and the user d is present at a position more distant than that of the user b in the middle. Further, in the upper left part of FIG. 4, the window W1 is displayed at a position on the left side of the display section 33. Note that, the upper left part of FIG. 4 is a top view with respect to the display surface of the display section 33.

In step S13, the user recognition section 25 extracts facial images from the images.

In step S14, the user recognition section 25 executes authentication by the extracted facial images, and specifies user IDs. Note that, the user IDs are registered in advance in a database or the like, which is not shown, associated with a characteristic amount of the facial images. Therefore, the user recognition section 25 accesses this database, and specifies the user IDs of the users, by reading corresponding user IDs.

In step S15, the user recognition section 25 specifies the positions of the facial images in the front direction of the display section 33, which become browsing positions of the users, and supplies the specified positions to the browsability list generation section 26 together with information of the browsing condition.

In step S16, the browsability list generation section 26 causes visual field ranges on the display section 33 of the users to be specified, based on information of the supplied user IDs and positions of the facial images and information of the browsing condition. That is, a visual field range set in a range of a viewing angle θ is set for each of the users a through to d such as shown in the upper left part of FIG. 4.

More specifically, the visual field range is calculated by a viewing angle θ in the horizontal direction. If the viewing angle is constant, the visual field range is specified by a distance between the display section 33 and a user. That is, as shown in the upper left part of FIG. 4, the ranges sandwiched by the dotted lines forming viewing angles θ on the display section 33 become visual field ranges Va through to Vd for each of the users a through to d.

In step S17, the browsability list generation section 26 determines the browsability of each window, based on the display position on the display section 33 of each window supplied by the window management section 32, and the visual field range of each user, and causes a determination result to be stored in the browsability list storage section 27 as a browsability list.

That is, for example, in the case of the browsing condition on the upper left part of FIG. 4, since a window W11 is included on the display section 33 in the visual field range Va of the user a, it is determined that browsing is possible. Further, since the window W11 is included on the display section 33 in the visual field range Vb of the user b, it is determined that browsing is possible. In addition, since the window W11 is not included in the visual field range Vc of the user c, it is determined that browsing is not possible. Further, while the window W11 is included in the visual field range Vd of the user d, the width in the horizontal direction of the window W11 is small with respect to the visual field range Vd, and will be difficult to visually recognize, and so it is determined that browsing is not possible.

The browsability list generation section 26 obtains an acceptability result of each window for each of the users, generates a browsability list such as that shown in the upper right part of FIG. 4, and causes the generated browsability list to be stored in the browsability list storage section 27. In the upper right part of FIG. 4, a user ID column is included on the left side, and a, b, c and d are registered from the top. Further, a column which registers an acceptability of browsability is included on the right side, and determination results which state "possible", "possible", "not possible" and "not possible" are shown from the top.

Further, in the case of the browsing condition of the lower left part of FIG. 4, since a window W12 is included in the respective visual field ranges Va and Vc of the users a and c, "possible" is registered which shows that browsing is possible, and since the window W12 is not included in the visual field range Vb of the user b, "not possible" is registered which shows that browsing is not possible.

The browsability list generation section 26 successively updates the browsability list such as described above, and causes the updated browsability list to be stored in the browsability list storage section 27. Note that, since the browsability list is continuously updated in real time, only the latest information is usually recorded for each window.

In step S18, the browsability history generation section 28 reads the browsability list stored in the browsability list storage section 27, and at the time when updated information is generated, updates information in which a change has occurred with that of the immediately prior condition so as to be reflected as a browsability history, and causes the updated information to be stored in the browsability history storage section 29.

The browsability history is that such as shown in FIG. 5, for example, and includes a display start time column, a display end (update) time column and a browsability users column from the top for each window (for each content executed by an application program).

In FIG. 5, the browsability history corresponding to the window W1 is shown in the upper stage, and the browsability history corresponding to the window W2 is shown in the second stage.

In the browsability history corresponding to the window W1 in the upper stage, [2013/11/11 10:10] is described in the display start time column, [2013/11/11 10:15] is described in the display end (update) time column, and [b, c] is described in the browsability users column. In this way, the window W1 shows browsing by users b and c between 10:10 and 10:15 on Nov. 11, 2013. The window W1 shows browsing by users b, c and d between 10:15 and 12:00 on the same day. Further, it shows browsing by user b between 9:00 and 11:00, and browsing by users b and e between 11:00 and 11:05, on Nov. 22, 2013.

In addition, the window W2 shows browsing by user c between 10:13 and 10:18 on Nov. 11, 2013. Further, it shows browsing by user b between 9:00 and 11:00, and browsing by users b and e between 11:00 and 11:05, on Nov. 22, 2013.

In step S19, the white list generation section 30 generates (updates) the white list, based on the browsability history stored in the browsability history storage section 29, causes the generated white list to be stored in the white list storage section 31, and the process returns to step S11.

Figure 6:
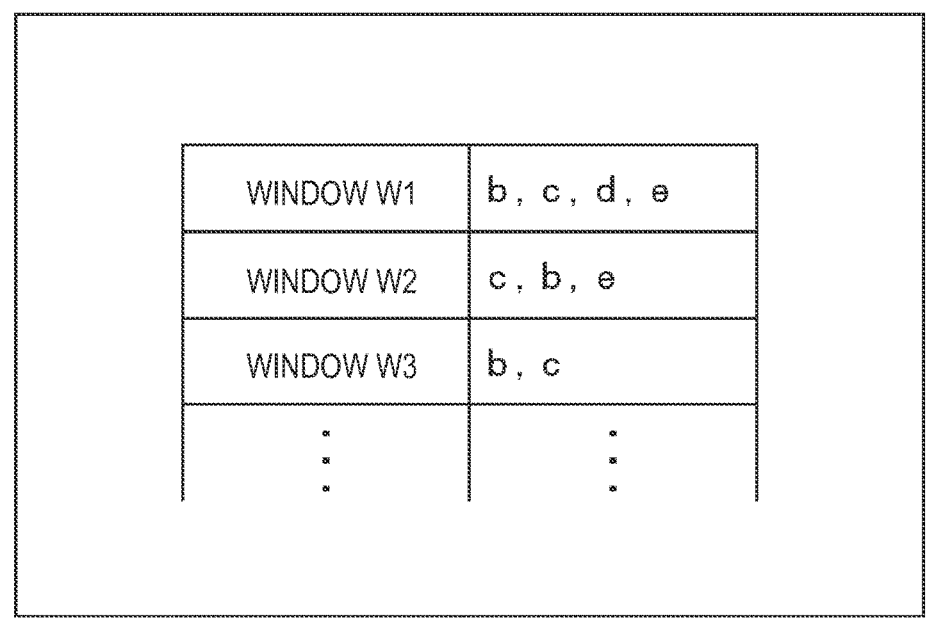

That is, for example, the white list generation section 30 generates (updates) the white list such as that shown in FIG. 6, and causes the generated white list to be stored in the white list storage section 31. In the white list of FIG. 6, users who are recognized as browsing are registered for each of the windows W1 through to W3. In the case of FIG. 6, users who have been registered in the browsability history once for the window W1 of FIG. 5 as browsability users are registered for the window W1, and so users b, c, d and e are registered. Similarly, users c, b and e are registered for the window W2.

According to the above described processes, users recognized once as being capable of browsing for each window can be registered in a white list as users who are permitted to browse, and the registered users can be stored in the white list storage section 31. Note that, while a description has been made heretofore for an example in which the possibility of browsing is determined based on a visual field range, a browsing position and a distance up to the windows displayed in the display section 33 for each user, the possibility of browsing may be determined by additionally taking into consideration visual power or the like. In addition, while a description has been made heretofore by taking into consideration only a visual field range in the horizontal direction, it may similarly take into consideration a visual field range in the vertical direction.

<Browsing Management Process>

Figure 7:
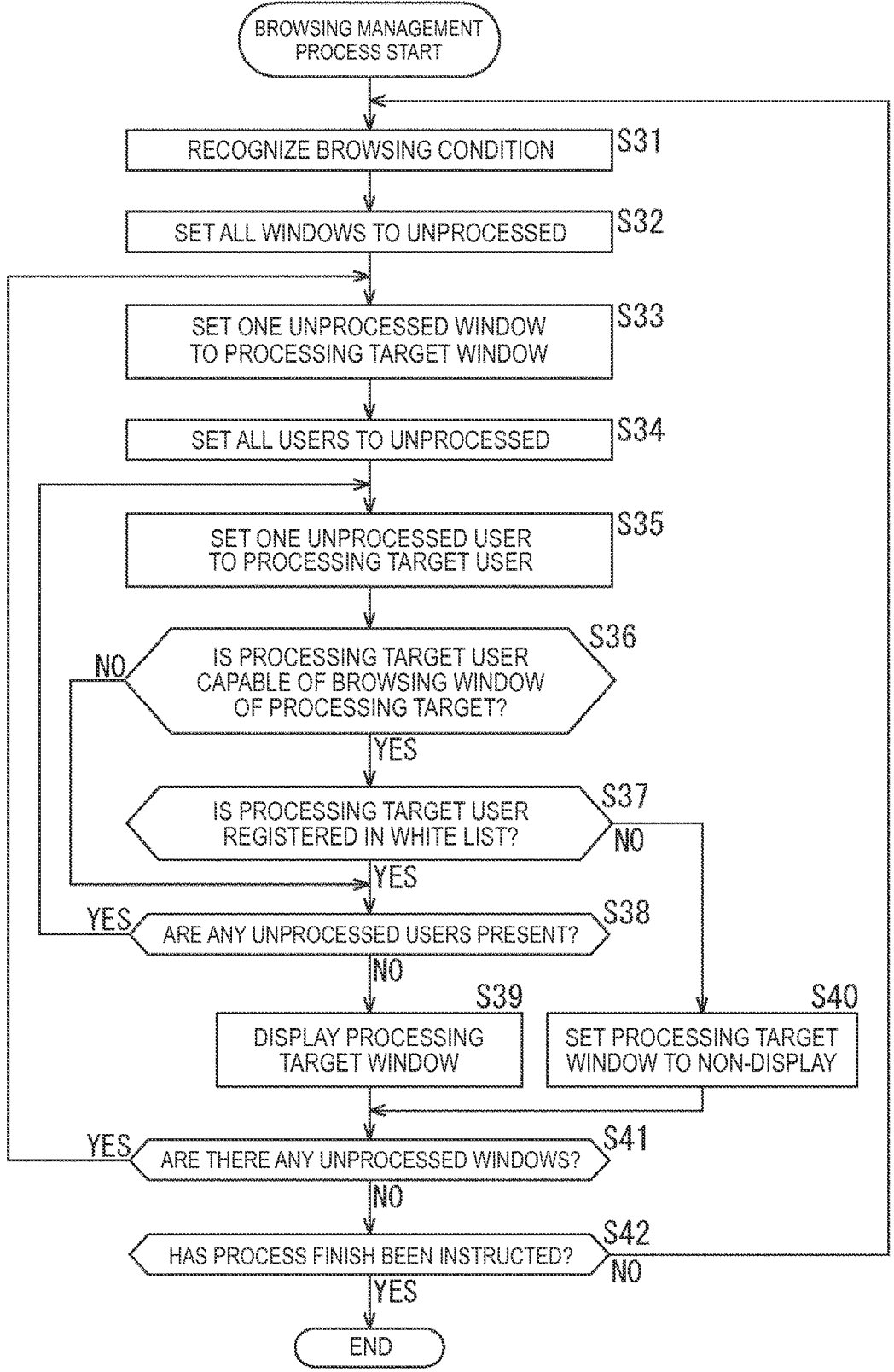
FIG. 7 is a flow chart which describes a browsing management process by the information processing apparatus of FIG. 1.

Next, a browsing management process will be described with reference to the flow chart of FIG. 7.

In step S31, the window management section 32 reads the browsability list stored in the browsability list storage section 27. That is, since the browsability list is a list in which an acceptability of browsability of each window displayed on the display section 33 is registered in real time, the window management section 32 can recognize the present users who become browsers. Further, the window management section 32 acquires information of the browsing condition supplied by the browsing condition recognition section 24, and recognizes the browsing condition. In this way, the window management section 32 can recognize the present positions of the users with respect to the display section 33, and the users who become browsers for the windows.

In step S32, the window management section 32 sets all of the windows registered in the read browsability list to unprocessed windows.

In step S33, the window management section 32 sets any one of the unprocessed windows to a processing target window.

In step S34, the window management section 32 sets all of the users registered in the read browsability list to unprocessed users.

In step S35, the window management section 32 sets any one of the unprocessed users of the browsability list of the processing target window to a processing target user.

In step S36, the window management section 32 determines whether or not browsability of the processing target user is possible, and in the case where it is determined to be possible, for example, for example, the process proceeds to step S37.

In step S37, the window management section 32 reads the latest white list, by accessing the white list storage section 31, and determines whether or not the processing target user is registered in the white list for the processing target window. In the case where the processing target user is registered in the white list in step S37, for example, the process proceeds to step S38.

In step S38, the window management section 32 determines whether or not any other unprocessed users are present, and in the case where an unprocessed user is present, the process returns to step S35. That is, it determines whether or not a user is registered in the white list for all of the users. Then, in the case where it is determined that no unprocessed users are present in step S38, the process proceeds to step S39.

In step S39, the window management section 32 displays the processing target window on the display section 33, or continues a display if the processing target window is being displayed, and maintains a state which can be browsed for the users.

On the other hand, in the case where the processing target user is not registered in the white list in step S37, in step S40, the window management section 32 sets the processing target window to a non-display. That is, in the case when in a state were a user who is not registered in the white list is capable of browsing by himself or herself, the processing target window is controlled in a display state not able to be browsed or difficult to be browsed.

In step S41, the window management section 32 determines whether or not any unprocessed windows are present, and in the case where an unprocessed window is present, the process returns to step S33, and the processes of steps S33 through to S41 are repeated until the processes have been performed for all of the windows. Then, in the case where no unprocessed windows are present in step S41, that is, in the case where it is considered that all windows have been processed, the process proceeds to step S42.

In step S42, the window management section 32 determines whether or not the operation section 21 has been operated and a process finish instructed, and in the case where a process finish has not been instructed, the process returns to step S31. That is, steps S31 through to S42 are repeated until a process finish is instructed. Then, when a process finish is instructed, the process ends.

Figure 8:
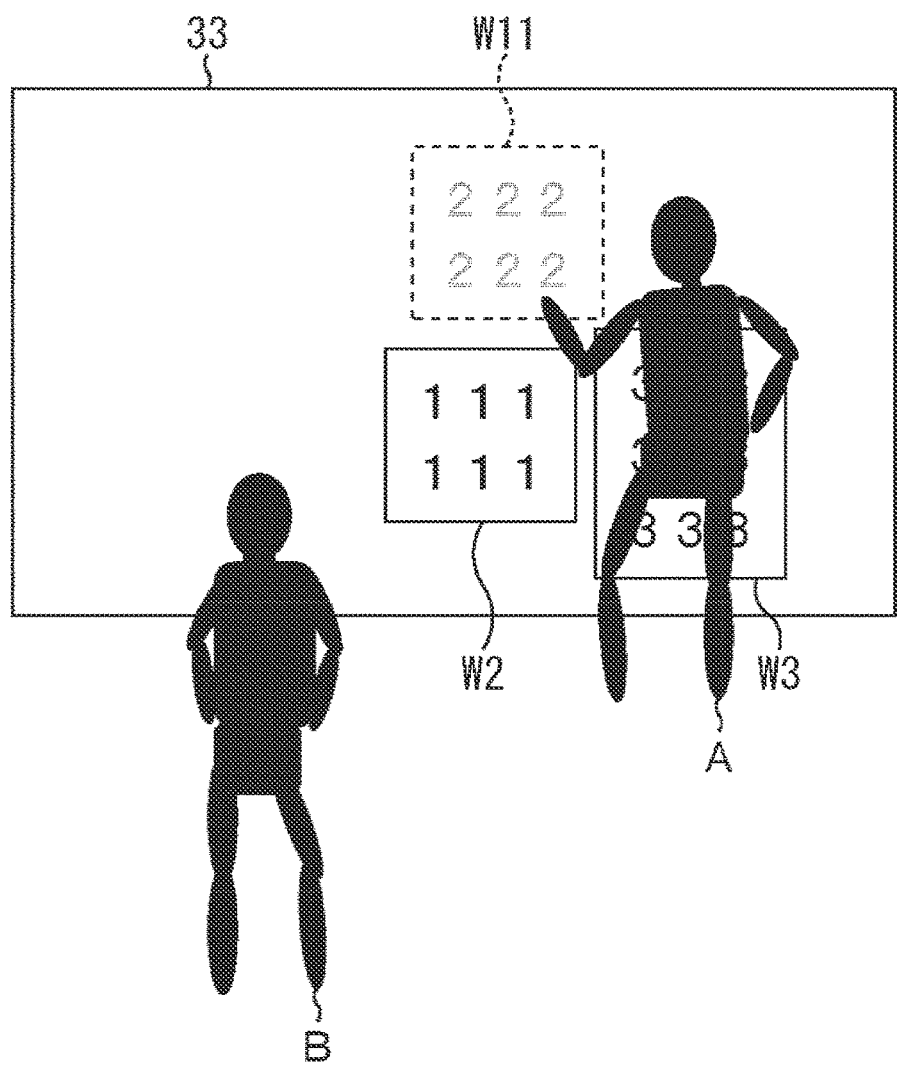
FIG. 8 is figure which describes an example of the case in which a window is set to a non-display.

That is, in the case where a user is present by himself or herself who is not registered in the white list for the processing target window, the processing target window is set to a non-display. For example, as shown in FIG. 3, in the case where it is not wanted for user B to be able to browse window W1, from among the display section windows W1 through to W3, as this is not registered in the white list, window W1 will be set to a non-display as shown by window W11, for example, such as shown in FIG. 8. In this way, for example, even if user A who manages the operation of the window W1 appears at a browsing position so that user B, for whom browsing is not wanted, is suddenly able to browse, since the window W1 is set to the window W11 of a non-display state by the above described process, it becomes possible for the user to maintain privacy and security without having to intentionally perform a setting in advance.

Further, while a description has been made heretofore for an example in which a window which becomes a target is set to a non-display, in the case where a user for whom browsing is not wanted appears, the presence of the window originally displayed will not be known when set to a non-display, and so may be displayed semi-transparent to the extent that is difficult to decipher.

Figure 9:
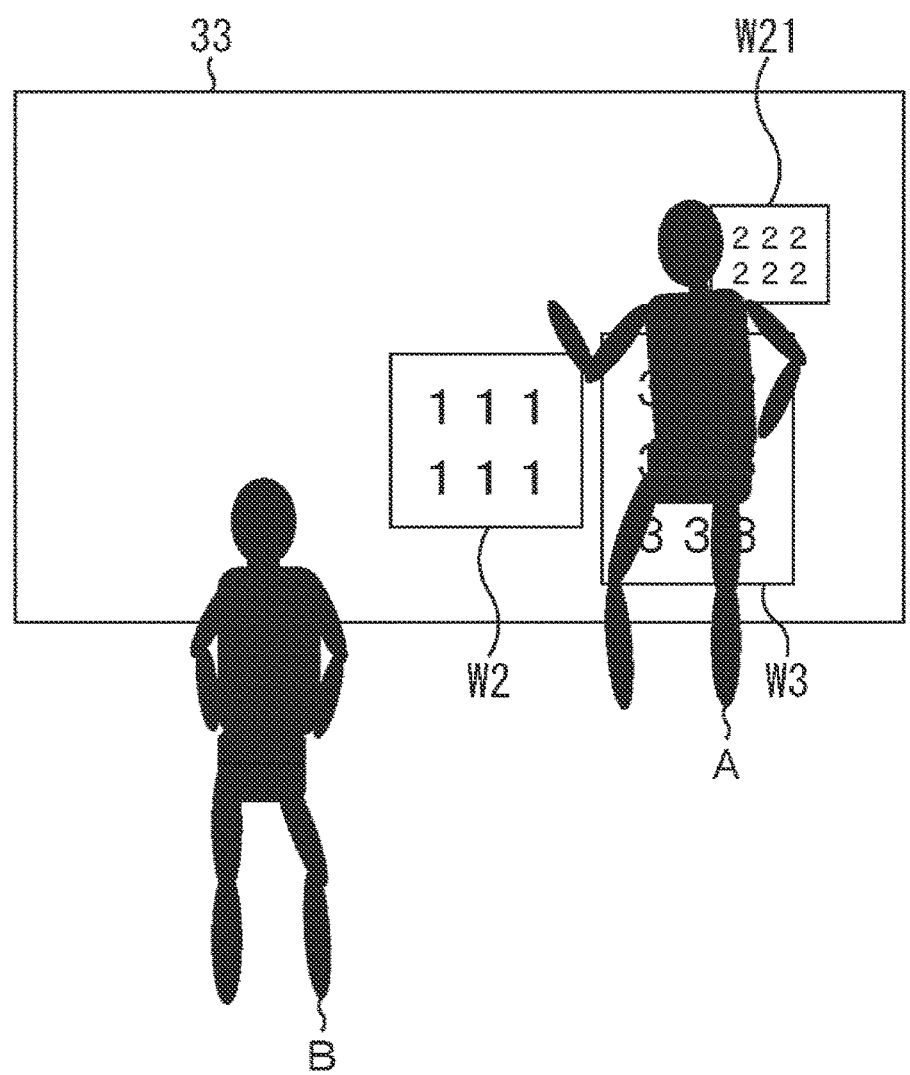
FIG. 9 is a figure which describes an example in which a window is displayed by changing to a position difficult to be browsed.

Further, in the case where a user for whom browsing is not wanted appears, since a state of not being able to browse the window which becomes a target may be produced, a state may be set in which it is difficult to browse by adjusting the display position, at the time when user B appears, such as making the window small compared to the window W1 of FIG. 3, and additionally displaying the window as a window W21 at a position hidden by user A which is difficult to browse from user B, such as shown in FIG. 9, for example. Further, in addition to this, in the case where a user for whom browsing is not wanted appears, since a state of not being able to browse the window which becomes a target may be produced, a process may be applied in which the display size of the window is made small to the extent that browsing is not possible, only the font size within the window is made small, or a mosaic is applied to the image, or a combination of these processes may be applied.

2. Second Embodiment

Configuration Example of the Information Processing System

In the above series of processes, while a state is continued in which users who are not registered in the white list are not able to browse, in the case where a window which becomes a target is not wanted to be browsed for a prescribed user, a list of the windows set to a non-display may be transmitted to a portable terminal of a user who manages the windows, and by outputting an instruction of a display for any of the windows from among these which are wanted to be changed to a state capable of being browsed, these windows can be changed to a state capable of being browsed.

Figure 10:
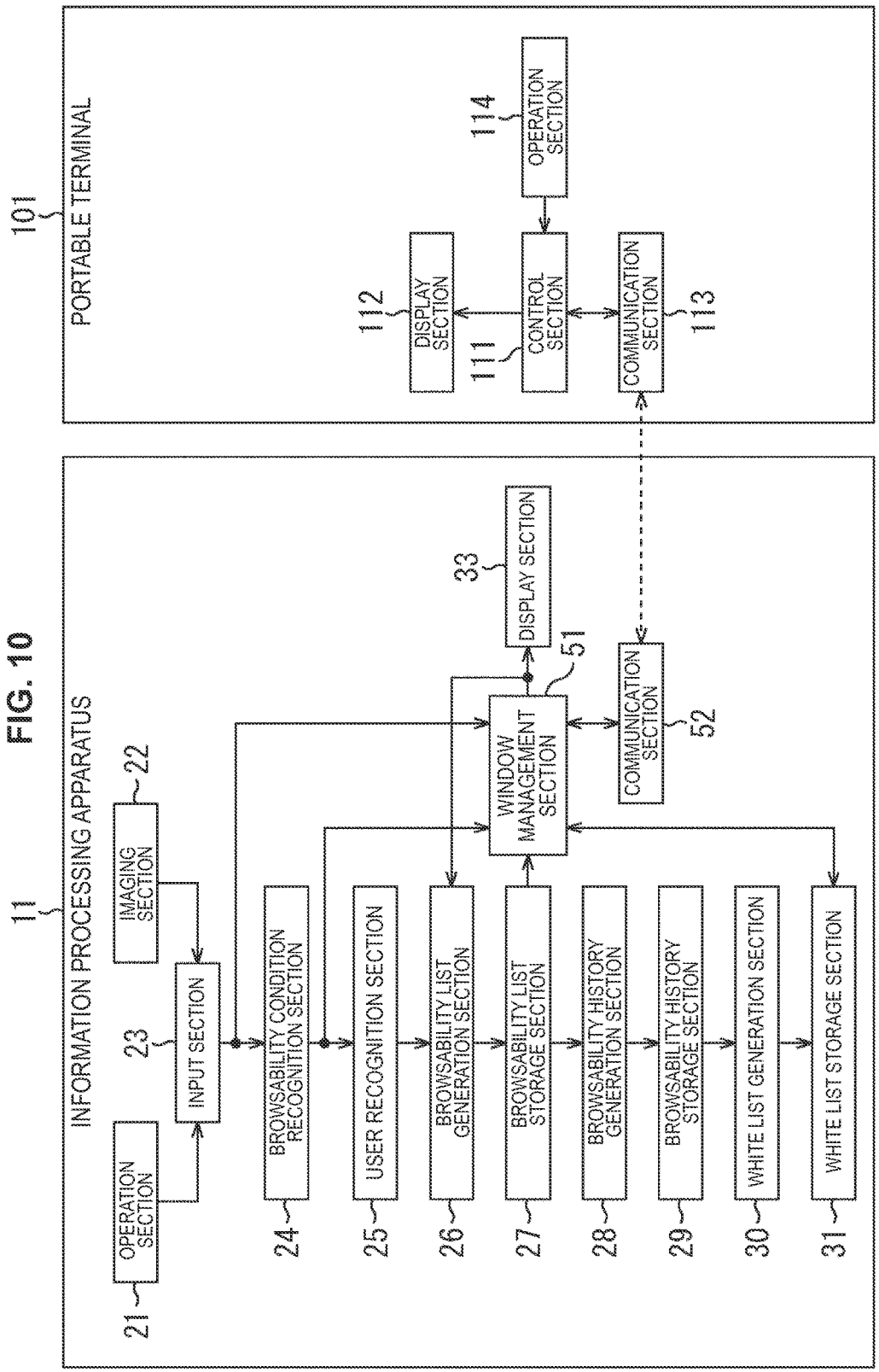
FIG. 10 is a block diagram which describes a configuration of an embodiment of an information processing system applicable to the present disclosure.

FIG. 10 is a block diagram which shows a configuration example of an information processing system, which transmits a list of the windows set to a non-display to a portable terminal of a user who manages the windows, and by selecting any of these windows which are wanted to be changed to a state capable of being browsed, can change these windows to a state capable of being browsed.

Note that, in FIG. 10, the same reference numerals and names are attached for the configurations which include the same functions as the configurations in the information processing apparatus 11 of FIG. 1, and a description of these will be omitted. That is, the information processing system of FIG. 10 is constituted by an information processing apparatus 11 and a portable terminal 101, and the information processing apparatus 11 of FIG. 10 basically includes functions the same as those of the information processing apparatus 11 of FIG. 1. In the information processing apparatus 11 of FIG. 10, the differences with the information processing apparatus 11 of FIG. 1 are the points of including a window management section 51 instead of the window management section 32, and newly including a communication section 113 of the portable terminal 101 and a communication section 52 which communicates via a public network or the like.

Further, when information constituted from a list of the windows in a non-display state transmitted by the communication section 52 of the information processing apparatus 11 is received, the portable terminal 101 possessed by a user who manages the windows performs a display on the display section 112, and causes a selection image, which instructs a display by releasing any of the non-display windows, to be displayed. When an operation is performed which instructs the release of a non-display of any one of the non-display windows, by performing an operation by the operation section 114, the control section 111 transmits corresponding information to the information processing apparatus 11.

In more detail, the portable terminal 101 includes a control section 111, a display section 112, a communication section 113, and an operation section 114. The control section 111 controls all the operations of the portable terminal 101. Further, the display section 112 is constituted by an LCD or an organic EL, and displays a processing result executed by the control section 111 and information operated and input by the operation section 114. The operation section 114 is a touch panel or the like integrated with the display section 112, for example, receives an input of various types of information input by an operation by a user who manages the windows, and supplies the received input to the control section 111.

<Non-Display Release Process>

Figure 11:
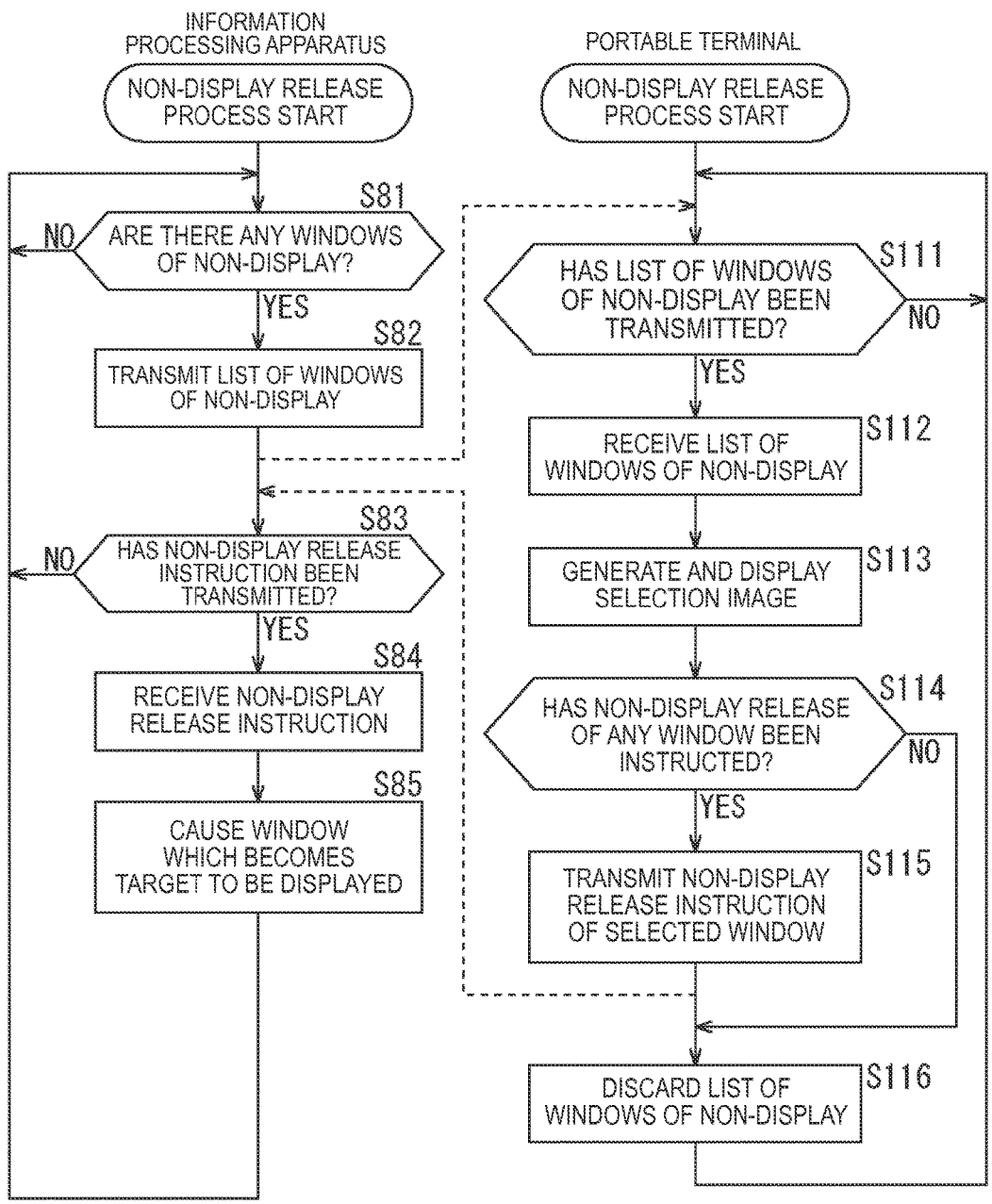
FIG. 11 is a flow chart which describes a non-display release process by the information processing system of FIG. 10.

Next, a non-display release process, by the information processing system of FIG. 10, will be described with reference to the flow chart of FIG. 11.

In step S81, the window management section 51 determines whether or not any windows set to a non-display are present, and the same process is repeated until it is determined that a window is present. Then, in the case where a window which becomes a non-display has been generated, for example, by the above-described process of step S40, in step S81, the process proceeds to step S82.

In step S82, the window management section 51 generates a list which constitutes a list of windows set to a non-display, and causes the generated list to be transmitted to the portable terminal 101 of a user who manages the windows, by controlling the communication section 52.

In step S111, the control section 111 of the portable terminal 101 determines whether or not a list which constitutes a list of windows of a non-display has been transmitted by controlling the communication section 113, and repeats the same process until it is determined that a list has been transmitted. In the case where a list which constitutes a list of windows of a non-display has been transmitted, for example, by the process of step S82, in step S111, the process proceeds to step S112.

In step S112, the control section 111 causes the transmitted list of windows of a non-display to be received, by controlling the communication section 113.

Figure 12:
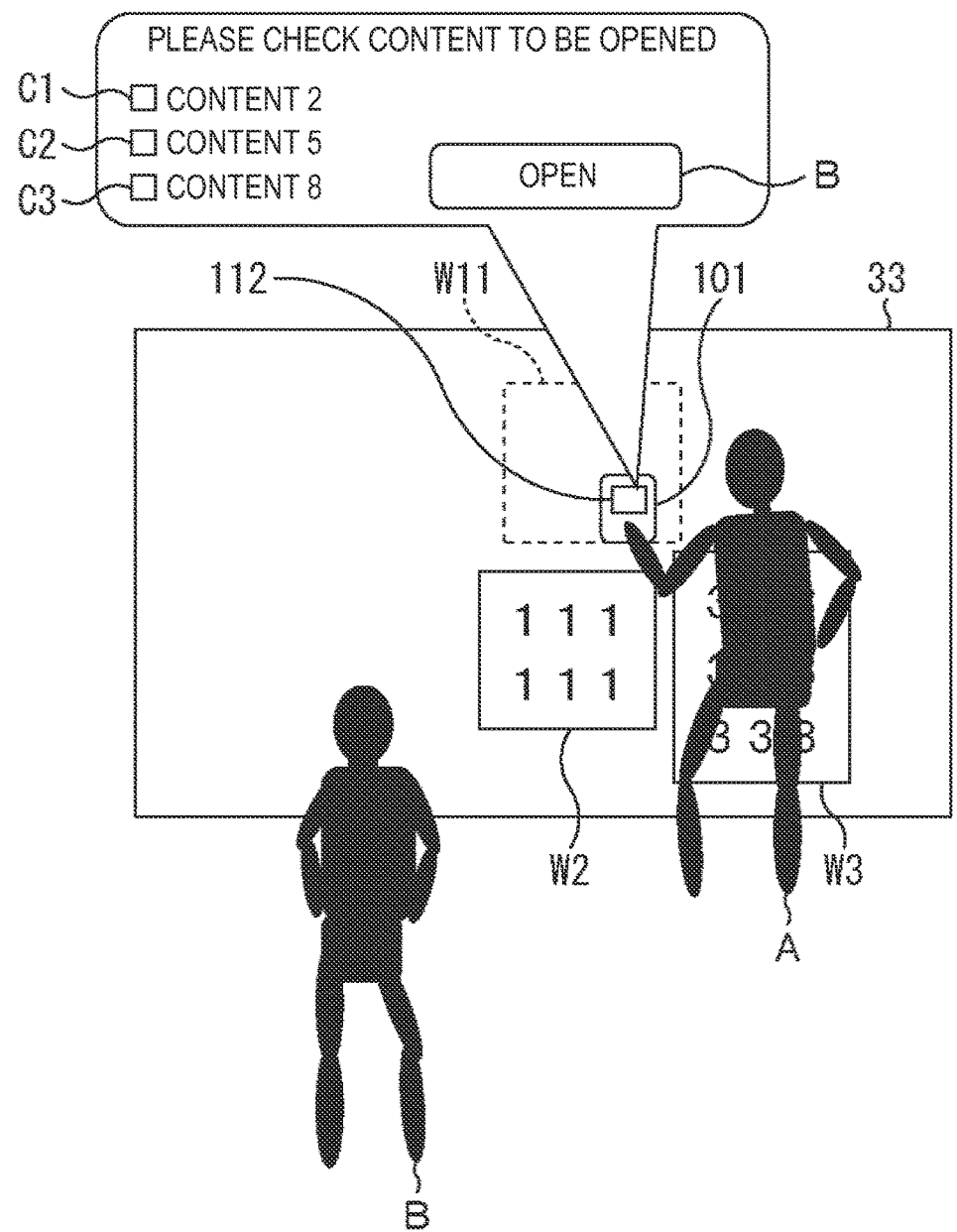
FIG. 12 is a figure which describes a non-display release process by the information processing system of FIG. 10.

In step S113, the control section 111 generates a selection image which selects a window to which non-display it to be released, based on the received list of windows of a non-display, and causes the generated selection image to be displayed on the display section 112. For example, a selection image such as that shown in FIG. 12 is displayed on the display section 112 in the portable terminal 101 which is held by a user A. In the selection image of FIG. 12, content 2, 5 and 8 corresponding to the list of windows set to a non-display are displayed, and respective check boxes C1 through to C3 are included. Further, an operation button B on which "open" is written, which is operated at the time when the release of a non-display is determined by any of the check boxes being checked, is displayed next to the check boxes C1 through to C3 of the content 2, 5 and 8 corresponding to the windows set to a non-display.

In step S114, the control section 111 determines whether or not a non-display release of any of the windows has been instructed, by performing an operation by the operation section 114. For example, in the case where the operation section 114 is operated, any of the check boxes C1 through to C3 of FIG. 12, which are displayed on the display section 112, are checked, and the button B is additionally pressed, a non-display release considered to be instructed, and the process proceeds to step S115.

In step S115, the control section 111 causes an instruction, which release a non-display of a window managing content to which a check has been performed to the check box, to be transmitted to the information processing apparatus 11, by controlling the communication section 113.

In step S116, the control section 111 discards the information of the list of non-display windows, and returns to the process of step S111.

On the other hand, in step S83, the window management section 51 determines whether or not a non-display release instruction has been transmitted from the portable terminal 101, by controlling the communication section 52, and in the case where it has been transmitted, the process proceeds to step S84.

In step S84, the window management section 51 receives the non-display release instruction transmitted by the portable terminal 101, by controlling the communication section 52.

In step S85, the window management section 51 releases a non-display of the window to which the release of a non-display is instructed, and causes the released window to be displayed on the display section 33.

According to such a process, by having a non-display released once, it becomes possible to perform a display in a state where the window can be browsed for a user who has not been registered in the white list up to now. As a result of this, in the white list generation process of FIG. 2, since a user who has not been registered in the white list up to now is newly registered in the white list, by becoming capable of browsing once, it becomes possible for the user to browse from here onwards.

On the other hand, in the case where a user appears for whom a prescribed window has been in a state which can be browsed up until this time, but is wanted to be in a state not able to be browsed, that is, a user appears for whom exclusion from the white list is wanted, the window which becomes a target is set to a non-display, and it becomes possible to exclude the user from the white list, upon resetting the browsability history storage section 29.

Further, as described above, by having a list of windows set to a non-display transmitted to the portable terminal when a window set to a non-display is generated, it becomes possible to notify a user who manages (possesses) the windows that a window has been set to a non-display. In addition, the user may be notified that a window has set to a non-display with audio, not by the portable terminal, but by a headset or the like, for example, or may notified by a vibration function of the portable terminal.

According to the above described processes, it becomes possible for only users registered in a white list to browse windows displayed on the display section 33. Therefore, since a user who browses the windows of the display section 33 for the first time is not registered in the white list as a matter of course, windows for which it may be necessary to become a browsable state are set to a non-display. Accordingly, it becomes possible for a user who browsing the windows of the display section 33 for the first time to not necessarily be able to browse even if moving to a browsing position at which the display section 33 can be browsed. In addition, a state of not being able to browse will continue until this user is newly registered in the white list.

Also, when a user who manages (possesses) the windows uses the portable terminal, in such a state where a user who is not able to browse moves to a browsing position at which the windows displayed on the display section 33 can be browsed, and a non-display release process is executed, browsing will become possible for the users who are browsers. In addition, when browsing becomes possible once, a user for whom browsing becomes possible will be registered in the white list, by the white list generation process, and so a state in which browsing is possible will be maintained from here onwards.

As a result, it becomes possible to be implemented, when displaying content by a large-sized display panel, without specially setting an acceptability of browsing of the content for a plurality of users.

Incidentally, the above series of processes can, for example, be executed by hardware, or can be executed by software. In the case where the series of processes is executed by software, a program configuring this software is installed in a computer included in dedicated hardware, or a general-purpose personal computer which can execute various functions when various programs are installed, etc., from a recording medium.

Figure 13:
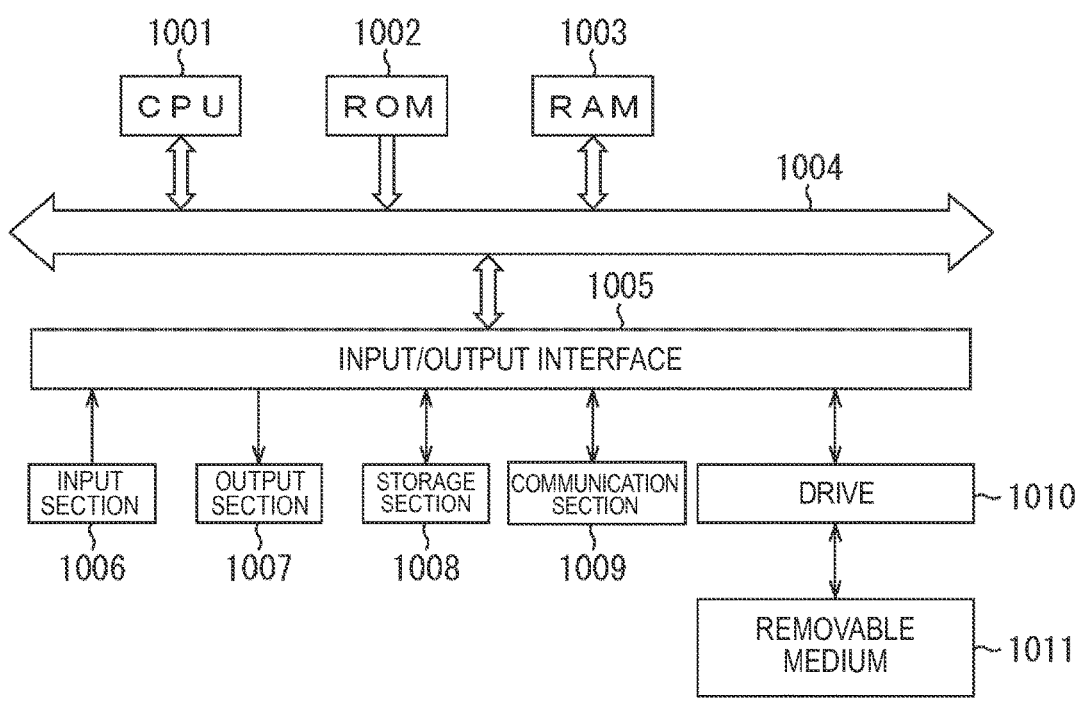
FIG. 13 is a figure which describes a configuration example of a general-purpose personal computer.

FIG. 13 shows an example configuration of a general-purpose personal computer. The computer includes a CPU (Central Processing Unit) 1001. An input/output interface 1005 is connected to the CPU 1001 through a bus 1004. A ROM (Read Only Memory) 1002 and a RAM (Random Access Memory) 1003 are connected to the bus 1004.

An input section 1006 including an input device, such as a keyboard, a mouse, etc., which is used by the user to input an operation command, an output section 1007 which outputs a process operation screen or an image of a process result to a display device, a storage section 1008 including a hard disk drive etc. which stores a program or various items of data, and a communication section 1009 including a LAN (Local Area Network) adaptor etc. which performs a communication process through a network typified by the Internet, are connected to the input/output interface 1005. Also, connected is a drive 1010 which reads and writes data from and to a removable medium 1011, such as a magnetic disk (including a flexible disk), an optical disk (including a CD-ROM (Compact Disc-Read Only Memory) and a DVD (Digital Versatile Disc)), an magneto-optical disk (including an MD (Mini Disc)), or a semiconductor memory, etc.

The CPU 1001 executes various processes according to a program stored in the ROM 1002 or a program which is read from the removable medium 1011, such as a magnetic disk, an optical disk, a magneto-optical disk, or a semiconductor memory, etc., is installed in the storage section 1008, and is loaded from the storage section 1008 to the RAM 1003. The RAM 1003 also stores data which is requested when the CPU 1001 executes various processes, etc., as appropriate.

In the computer configured as described above, the CPU 1001 loads a program that is stored, for example, in the storage section 1008 onto the RAM 1003 via the input/output interface 1005 and the bus 1004, and executes the program. Thus, the above-described series of processing is performed.

Programs to be executed by the computer (the CPU 1001) are provided being recorded in the removable medium 1011 which is a packaged medium or the like. Also, programs may be provided via a wired or wireless transmission medium, such as a local area network, the Internet or digital satellite broadcasting.

In the computer, by inserting the removable medium 1011 into the drive 1010, the program can be installed in the storage section 1008 via the input/output interface 1005. Further, the program can be received by the communication section 1009 via a wired or wireless transmission medium and installed in the storage section 1008. Moreover, the program can be installed in advance in the ROM 1002 or the storage section 1008.

It should be noted that the program executed by a computer may be a program that is processed in time series according to the sequence described in this specification or a program that is processed in parallel or at necessary timing such as upon calling.

Further, in the present disclosure, a system has the meaning of a set of a plurality of configured elements (such as an apparatus or a module (part)), and does not take into account whether or not all the configured elements are in the same casing. Therefore, the system may be either a plurality of apparatuses, stored in separate casings and connected through a network, or a plurality of modules within a single casing.

An embodiment of the disclosure is not limited to the embodiments described above, and various changes and modifications may be made without departing from the scope of the disclosure.

For example, the present disclosure can adopt a configuration of cloud computing which processes by allocating and connecting one function by a plurality of apparatuses through a network.

Further, each step described by the above mentioned flow charts can be executed by one apparatus or by allocating a plurality of apparatuses.

In addition, in the case where a plurality of processes is included in one step, the plurality of processes included in this one step can be executed by one apparatus or by allocating a plurality of apparatuses.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1) An information processing apparatus including:

a display section which displays a window for each content including an application program used for each user; and a window management section which manages a display of the window displayed on the display section, at the time when the window is displayed on the display section in a state capable of being browsed by a user not registered in a permitter list to which a user permitted to browse the window is registered, in a state not able to be browsed or difficult to be browsed for a user not registered in the permitter list.

(2) The information processing apparatus according to (1), further including:

an imaging section which captures an image of a range in which users browsing the display section are present;

a browsability list generation section which specifies a visual field range for each of the users based on a browsing position with respect to the display section of each user within the image and a display position of each window displayed on the display section, determines an acceptability of browsing each window for each of the users based on whether or not each window is within a visual field range and within a browsable distance, and registers the determined acceptability of browsing each window for each of the users in a browsability list;

a browsability history generation section which generates a history of the browsability list; and a list registration section which registers a user registered in a browsability history as being capable of browsing to the permitter list for each of the windows.

(3) The information processing apparatus according to (1) or (2), wherein the window management section manages a display of the window displayed on the display section, at the time when the window is displayed on the display section in a state capable of being browsed by a user not registered in the permitter list, in a state not able to be browsed or difficult to be browsed for a user not registered in the permitter list by switching to a display of any one, or combination, of a non-display, a semi-transparent display, a compressed display, and a position change display from a browsing position of a user not registered in the permitter list to a position not able to be browsed or difficult to be browsed.

(4) The information processing apparatus according to any one of (1) to (3), further including:

a communication section which exchanges data with a portable terminal, wherein, in the case where a display of the window displayed on the display section is managed in a state not able to be browsed or difficult to be browsed for a user not registered in the permitter list, the window management section transmits, to the portable terminal, a non-browsable window list including a list of windows managed in a state not able to be browsed or difficult to be browsed for a user not registered in the permitter list, by controlling the communication section.

(5) The information processing apparatus according to (4), wherein, in the case where an instruction is received, from the portable terminal, for switching any of the windows registered in the non-browsable window list to a browsable state, the window management section manages the window managed in a state not able to be browsed or difficult to be browsed for a user not registered in the permitter list so as to be switched to a browsable state and displayed, by controlling the communication section.

(6) The information processing apparatus according to (5), further including:

a registration section, in the case where the window is displayed on the display section, which registers a user browsing the window in the permitter list.

(7) An information processing method including:

displaying, by a display section, a window for each content including an application program used for each user; and managing a display of the window displayed on the display section, at the time when the window is displayed on the display section in a state capable of being browsed by a user not registered in a permitter list to which a user permitted to browse the window is registered, in a state not able to be browsed or difficult to be browsed for a user not registered in the permitter list.

(8) A program for causing a computer, which controls an information processing apparatus including a display section which displays a window for each content including an application program used for each user, to execute:

a process of managing a display of the window displayed on the display section, at the time when the window is displayed on the display section in a state capable of being browsed by a user not registered in a permitter list, in a state not able to be browsed or difficult to be browsed for a user not registered in the permitter list.

(9) A recording medium having a program recorded thereon, the program causing a computer, which controls an information processing apparatus including a display section which displays a window for each content including an application program used for each user, to execute:

a process of managing a display of the window displayed on the display section, at the time when the window is displayed on the display section in a state capable of being browsed by a user not registered in a permitter list, in a state not able to be browsed or difficult to be browsed for a user not registered in the permitter list.

(10) An information processing system including:

an information processing apparatus; and a portable terminal, wherein the information processing apparatus includes a display section which displays a window for each content including an application program used for each user, a window management section which manages a display of the window displayed on the display section, at the time when the window is displayed on the display section in a state capable of being browsed by a user not registered in a permitter list to which a user permitted to browse the window is registered, in a state not able to be browsed or difficult to be browsed for a user not registered in the permitter list, and a first communication section which exchanges data with the portable terminal, wherein, in the case where a display of the window displayed on the display section is managed in a state not able to be browsed or difficult to be browsed for a user not registered in the permitter list, the window management section transmits, to the portable terminal, a non-browsable window list including a list of windows managed in a state not able to be browsed or difficult to be browsed for a user not registered in the permitter list, by controlling the first communication section, and, in the case where an instruction is received, from the portable terminal, for switching any of the windows registered in the non-browsable window list to a browsable state, the window management section manages the window managed in a state not able to be browsed or difficult to be browsed for a user not registered in the permitter list so as to be switched to a browsable state and displayed, by controlling the first communication section, and wherein the portable terminal includes a communication section which receives the non-browsable window list, and transmits an instruction for switching any of the windows registered in the non-browsable window list to a browsable state, a display section which displays the non-browsable window list, and an operation section which inputs an instruction for switching any of the windows registered in the non-browsable window list to a browsable state.

What is claimed is:

1. An information processing apparatus, comprising:
a central processing unit (CPU) configured to:
control a display device to display at least one window for at least one content in a first display mode;
generate a permitter list based on a browsability of the displayed at least one window, wherein the browsability is an indication of whether each of a plurality of users is capable of browsing the at least one window based on a visual field range associated with each user;
generate history information of a browsability list that is associated with the browsability of the displayed at least one window,
wherein the history information of the browsability list indicates at least one of a display start time of the displayed at least one window or a display end time of the displayed at least one window;
update the permitter list by registration of all users of the plurality of users into the permitter list that are indicated by the history information of the browsability list as being capable of browsing the at least one window at least once;
control the displayed at least one window in a first state based on at least the permitter list or the browsability list, wherein, in the first state, the displayed at least one window is browsable by at least a first user of the plurality of users registered in the permitter list;
transmit a non-browsable window list to a portable terminal,
wherein the non-browsable window list is associated with the at least one window in a second state,
wherein, in the second state, a second user of the plurality of users is denied permission to browse the displayed at least one window, and
wherein the second user is unregistered in the permitter list;
receive an instruction from the portable terminal; and
control, based on the received instruction, the display device to display the at least one window in a third state, wherein, in the third state, the second user is permitted to browse the displayed at least one window.

2. The information processing apparatus according to claim 1, wherein the CPU is further configured to:
control an image sensor to capture an image of a region in which the plurality of users are present;
determine a browsing position of each of the plurality of users with respect to the display device based on the captured image;
determine a display position of the displayed at least one window on the display device based on the captured image;
determine the visual field range of each of the plurality of users based on the browsing position of each of the plurality of users and based on the display position of the displayed at least one window on the display device;
determine the browsability of the displayed at least one window for each of the plurality of users, based on whether the displayed at least one window is within:
the visual field range of each of the plurality of users, and
a first distance from the at least first user; and
register the browsability of the displayed at least one window in the browsability list.

3. The information processing apparatus according to claim 1,
wherein the CPU is further configured to switch the displayed at least one window from the first display mode to one of a semi-transparent display mode, a compressed display mode, or a position change display mode, and
wherein, in the compressed display mode, a display size of the displayed at least one window is reduced.

4. The information processing apparatus according to claim 1, wherein the CPU is further configured to register the second user in the permitter list based on the instruction.

5. The information processing apparatus according to claim 1, wherein the CPU is further configured to register the at least first user or the second user in the permitter list based on the history information of the browsability list.

6. An information processing method, comprising:
in an information processing device:
controlling a display device to display at least one window for at least one content in a first display mode;
generating a permitter list based on a browsability of the displayed at least one window, wherein the browsability is an indication of whether each of a plurality of users is capable of browsing the at least one window based on a visual field range associated with each user;
generating history information of a browsability list that is associated with the browsability of the displayed at least one window,
wherein the history information of the browsability list indicates at least one of a display start time of the displayed at least one window or a display end time of the displayed at least one window;
updating the permitter list by registration of all users of the plurality of users into the permitter list that are indicated by the history information of the browsability list as being capable of browsing the at least one window at least once;

controlling the displayed at least one window in a first state based on at least the permitter list or the browsability list, wherein, in the first state, the displayed at least one window is browsable by at least a first user of the plurality of users registered in the permitter list;

transmitting a non-browsable window list to a portable terminal,
wherein the non-browsable window list is associated with the at least one window in a second state,
wherein, in the second state, a second user of the plurality of users is denied permission to browse the displayed at least one window, and
wherein the second user is unregistered in the permitter list;

receiving an instruction from the portable terminal; and controlling, based on the received instruction, the display device to display the at least one window in a third state, wherein, in the third state, the second user is permitted to browse the displayed at least one window.

7. A non-transitory computer-readable medium having stored thereon computer-executable instructions, which when executed by a processor of an information processing apparatus, cause the processor to execute operations, the operations comprising:

controlling a display device to display at least one window for at least one content in a first display mode;

generating a permitter list based on a browsability of the displayed at least one window, wherein the browsability is an indication of whether each of a plurality of users is capable of browsing the at least one window based on a visual field range associated with each user;

generating history information of a browsability list that is associated with the browsability of the displayed at least one window,
wherein the history information of the browsability list indicates at least one of a display start time of the displayed at least one window or a display end time of the displayed at least one window;

updating the permitter list by registration of all users of the plurality of users into the permitter list that are indicated by the history information of the browsability list as being capable of browsing the at least one window at least once;

controlling the displayed at least one window in a first state based on at least the permitter list or the browsability list, wherein, in the first state, the displayed at least one window is browsable by at least a first user of the plurality of users registered in the permitter list;

transmitting a non-browsable window list to a portable terminal,
wherein the non-browsable window list is associated with the at least one window in a second state,
wherein, in the second state, a second user of the plurality of users is denied permission to browse the displayed at least one window, and
wherein the second user is unregistered in the permitter list;

receiving an instruction from the portable terminal; and controlling, based on the received instruction, the display device to display the at least one window in a third state, wherein, in the third state, the second user is permitted to browse the displayed at least one window.

8. An information processing system, comprising:
an information processing apparatus that includes:
a first central processing unit (CPU) configured to:
control a first display device to display at least one window for at least one content;
generate a permitter list based on a browsability of the displayed at least one window, wherein the browsability is an indication of whether each of a plurality of users is capable of browsing the at least one window based on a visual field range associated with each user;
generate history information of a browsability list that is associated with the browsability of the displayed at least one window,
wherein the history information of the browsability list indicates at least one of a display start time of the displayed at least one window or a display end time of the displayed at least one window;
update the permitter list by registration of all users of the plurality of users into the permitter list that are indicated by the history information of the browsability list as being capable of browsing the at least one window at least once;
control the displayed at least one window in a first state based on at least the permitter list or the browsability list, wherein, in the first state, the displayed at least one window is browsable by at least a first user of the plurality of users registered in the permitter list;
transmit a non-browsable window list to a portable terminal,
wherein the non-browsable window list is associated with the at least one window in a second state,
wherein, in the second state, a second user of the plurality of users is denied permission to browse the displayed at least one window, and
wherein the second user is unregistered in the permitter list;
receive an instruction from the portable terminal to switch the display of the at least one window from the second state to a browsable state,
wherein, in the browsable state, the second user is permitted to browse the displayed at least one window; and
control the first display device to switch the display of the at least one window from the second state to the browsable state, based on the received instruction; and
the portable terminal that includes:
a second display device; and
a second central processing unit (CPU) configured to:
receive the non-browsable window list;
control the second display device to display the non-browsable window list;
receive a user input from the portable terminal; and
transmit the instruction to the information processing apparatus, based on the received user input.

9. An information processing apparatus, comprising:
a central processing unit (CPU) configured to:
control a display device to display at least one window for at least one content at a first position on the display device in a first state,
wherein, in the first state, the displayed at least one window is browsable by at least a first user of a first plurality of users, and wherein the at least first user is unregistered in a permitter list;
store history information of a browsability list that is associated with a browsability of the displayed at least one window,
   wherein the history information of the browsability list indicates at least one of a display start time of the displayed at least one window or a display end time of the displayed at least one window;
control an image sensor to capture an image of a region in which the first plurality of users are present;
determine a distance of at least a second user of the first plurality of users from the display device based on the captured image;
determine a second position of the at least second user with respect to the display device based on the captured image;
determine the browsability of the displayed at least one window, based on the first position, the second position, and the determined distance,
   wherein the browsability is an indication of whether the displayed at least one window is accessible to the at least second user to browse based on a visual field range associated with the second user;
generate a list of a second plurality of users of the first plurality of users to register in the permitter list based on the stored history information of the browsability list, wherein the second plurality of users are permitted to browse the displayed at least one window after being registered into the permitter list, and wherein the second plurality of users are generated in the list based on being indicated by the history information of the browsability list as being capable of browsing the at least one window at least once; and
control the display device to display the at least one window, based on the browsability and the list of the second plurality of users,
transmit a non-browsable window list to a portable terminal,
   wherein the non-browsable window list is associated with the at least one window in a second state, and
   wherein, in the second state, the first user is denied permission to browse the displayed at least one window;
receive an instruction from the portable terminal; and
control the display device to display the at least one window in a third state, based on the instruction,
   wherein, in the third state, the first user is permitted to browse the displayed at least one window.

* * * * *